(12) United States Patent
Pettersson et al.

(10) Patent No.: US 8,210,122 B2
(45) Date of Patent: Jul. 3, 2012

(54) ARRANGEMENT AND METHOD FOR DETERMINING POSITIONS OF THE TEATS OF A MILKING ANIMAL

(75) Inventors: Maria Pettersson, Lidingö (SE); Johan Andrén Dinerf, Stockholm (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 12/662,430

(22) Filed: Apr. 16, 2010

(65) Prior Publication Data

US 2010/0199915 A1 Aug. 12, 2010

Related U.S. Application Data

(62) Division of application No. 10/594,881, filed as application No. PCT/SE2005/000427 on Mar. 23, 2005, now abandoned.

(30) Foreign Application Priority Data

| Mar. 30, 2004 | (SE) | ...................................... | 0400819 |
| Mar. 30, 2004 | (SE) | ...................................... | 0400820 |
| Mar. 30, 2004 | (SE) | ...................................... | 0400821 |

(51) Int. Cl.
*A01J 5/017* (2006.01)

(52) U.S. Cl. .................................... 119/14.08; 119/14.1

(58) Field of Classification Search ................ 119/14.01, 119/14.1, 14.8, 14.11, 14.18, 14.08; 382/256, 382/257, 199, 100, 154; 700/245–261; *A01J 5/017*
See application file for complete search history.

(56) References Cited

U.S. PATENT DOCUMENTS 4,601,055 A 7/1986 Kent .............................. 382/303
(Continued)

FOREIGN PATENT DOCUMENTS

DE 37 42 867 A1 7/1989
(Continued)

OTHER PUBLICATIONS

459015, "Videokameraarrangemang", Research Disclosure, p. 1162, Jul. 2002.

(Continued)

*Primary Examiner* — Rob Swiatek
*Assistant Examiner* — Marisa Conlon
(74) *Attorney, Agent, or Firm* — Finnegan, Henderson, Farabow, Garrett & Dunner, LLP

(57) ABSTRACT

An arrangement for determining positions of the teats of an animal is provided in a milking system comprising a robot arm for automatically attaching teat cups to the teats of an animal when being located in a position to be milked, and a control device for controlling the movement of the robot arm based on determined positions of the teats of the animal. The arrangement comprises a camera pair directed towards the teats of the animal for repeatedly recording pairs of images, and an image processing device for repeatedly detecting the teats of the animal and determining their positions by a stereoscopic calculation method based on the repeatedly recorded pairs of images, wherein the cameras of the camera pair are arranged vertically one above the other, and the image processing device is provided, for each teat and for each pair of images, to define the position of the lower tip of the teat in the pair of images as conjugate points, and to find the conjugate points along a substantially vertical epipolar line.

32 Claims, 4 Drawing Sheets

U.S. PATENT DOCUMENTS

| | | | |
|---|---|---|---|
| 4,805,557 A | 2/1989 | Van Der Lely et al. | |
| 4,867,103 A | 9/1989 | Montalescot et al. | 119/14.08 |
| 5,069,160 A * | 12/1991 | Street et al. | 119/14.08 |
| 5,205,779 A | 4/1993 | O'Brien et al. | 452/157 |
| 5,666,903 A | 9/1997 | Bull et al. | |
| 5,791,284 A * | 8/1998 | van der Lely | 119/14.08 |
| 5,915,331 A * | 6/1999 | Kimm | 119/14.08 |
| 5,934,220 A * | 8/1999 | Hall et al. | 119/14.08 |
| 5,979,359 A | 11/1999 | Hansson | |
| 6,189,486 B1 * | 2/2001 | Lindholm | 119/14.02 |
| 6,213,051 B1 | 4/2001 | Fransen | 119/14.08 |
| 6,234,109 B1 * | 5/2001 | Andersson et al. | 119/14.08 |
| 6,431,116 B1 | 8/2002 | Nilsson | |
| 6,807,304 B2 | 10/2004 | Loce et al. | 382/209 |
| 2003/0097990 A1 * | 5/2003 | Bjork et al. | 119/14.08 |
| 2003/0145795 A1 | 8/2003 | Nilsson | 119/14.02 |
| 2004/0182325 A1 | 9/2004 | Sjolund et al. | 119/14.02 |
| 2004/0247186 A1 | 12/2004 | Graves et al. | 382/232 |
| 2005/0213841 A1 | 9/2005 | Linguraru et al. | 382/261 |
| 2006/0196432 A1 * | 9/2006 | Peacock | 119/14.08 |
| 2007/0064986 A1 | 3/2007 | Johnson | 382/128 |

FOREIGN PATENT DOCUMENTS

| | | |
|---|---|---|
| DE | 195 48 347 A1 | 7/1997 |
| EP | 1332667 A1 | 2/2002 |
| JP | 2001-119614 A | 4/2001 |
| WO | WO 96/20587 | 7/1996 |
| WO | WO 9903064 A1 | 1/1999 |
| WO | WO 01/52633 A1 | 7/2001 |
| WO | WO 02/00011 A1 | 1/2002 |
| WO | WO 0200011 A1 | 1/2002 |
| WO | WO 03/055297 A1 | 7/2003 |

OTHER PUBLICATIONS

Written Opinion for corresponding International Application No. PCT/SE2005/000427 dated Aug. 17, 2005.

* cited by examiner

Pre-processing
- Noise reduction
  - Mean filtering
  - Median filtering
  - Gaussian filtering
  - Low-pass filtering
- Correction for poor lightning
  - Histogram modification
- Removal of superfluous information
  - Motion detection Segmentation
- Finding edges
  - Laplace
  - Sobel
  - Prewitt
  - Difference of Gaussian
  - Shift and difference
  - Canny
  - Phase congruency
- Other segmentation methods
  - Thresholding
  - Image difference
  - Texture segmentation Representation
- Labeling
  - Connected Components Labeling Description
- Feature vector Classification
- Low-level classification
- High-level classification
  - HCMA
  - ML-classifier
  - Cluster analysis

Fig. 5

ARRANGEMENT AND METHOD FOR DETERMINING POSITIONS OF THE TEATS OF A MILKING ANIMAL

CROSS-REFERENCE TO RELATED APPLICATIONS

This application is a continuation of, and claims priority under 35 U.S.C. §120 to, U.S. application Ser. No. 10/594,881, filed Sep. 2, 2008 now abandoned, which is a 371 of, and further claims priority under 35 U.S.C. §120 to International Application No. PCT/SE2005/000427, filed Mar. 23, 2005, which is an international application claiming priority from Swedish Application No. 0400820-7, filed Mar. 30, 2004, Swedish Application No. 0400819-9, filed Mar. 30, 2004, and Swedish Application No. 0400821-5, filed Mar. 30, 2004, the entire contents of each of which is incorporated herein by reference.

TECHNICAL FIELD OF THE INVENTION

The present invention generally relates to dairy farm robot milking and to automatic attachment of teat cups related thereto.

DESCRIPTION OF RELATED ART AND BACKGROUND OF THE INVENTION

In a known milking system, wherein teat cups are automatically attached to the teats of a milking animal to be milked, a robot arm with a gripper is provided to grip and hold teat cups during the attachment of the teat cups. A laser emitting laser light and a video camera provided to register laser light as reflected from the teats of the milking animal are mounted on the robot arm. By aid of a method known as laser triangulation, the positions of the teats can be calculated. The movement of the robot arm can then be controlled in response to the calculated positions to be capable of finding the teats for teat cup attachments.

A drawback of such a milking system is that the camera, while being moved close to the milking animal, is exposed to dirt and possibly physical contact with the milking animal since the milking animal can make sudden movements. Further, the video camera can only be in active mode to seek for the teats when the robot arm already has collected a teat cup and initiated a movement towards the teats since the camera is fixedly mounted on the robot arm. Still further, the video camera occupies a considerable space on the robot arm, which may limit the use of the system.

In Research Disclosure, July 2002, p. 1162 is disclosed the use of an arrangement comprising a number of cameras fixedly mounted in the milking stall instead of using a video camera mounted on a movable robot arm. For instance, two or three video cameras can be mounted at each side of the milking animal to be milked, preferably on the walls of the milking stall or just outside thereof. Advantageously, the video cameras are directed diagonally upwards towards the region where the teats are when the milking animal has been positioned in the milking stall. A computer is provided for e.g. selecting two cameras, which together creates a stereoscopic image, which by means of image processing enables a substantially exact determination of the position of a teat. Two further cameras may be used to confirm the three-dimensional position of a teat. A robot arm is then moved to the teat based on the determined position.

While such an arrangement has several advantages such as a faster determination of the teats of the milking animal, a smaller and lighter robot arm, possibilities to better protect the cameras from dirt and from being damaged by kicks from the milking animal, and capabilities to monitor the complete milking operation for e.g. detecting a teat cup falling off the teat, it may be difficult to obtain a sufficiently robust, accurate, precise, and fast implementation, which is capable of controlling the robot arm to obtain a sufficiently high number of correct teat cup attachments.

SUMMARY OF THE INVENTION

A milking environment is a very difficult environment to perform stereo vision measurements. The environment is non-clean and dirt may settle on camera lenses. Further the cows are moving, and teats may not be visible to the cameras due to self-occlusion.

Another problem arises since each cow's physiology differs; the udders of the cows may be located at quite different locations, which put limitations on the positions of the cameras. For instance, the area where the teats most likely are has been found by empirical studies to be at least 500×600×480 $mm^3$ large.

Another problem arises since both color and texture of the teats are similar to the surface of the udder, which means that teat detection will be an arduous task: the contrast is low and color filters are of no use. The situation is even more complicated by the fact that the size, shape, color structure, morphological structure and texture may vary quite much from animal to animal.

Accordingly, it is an object of the present invention to provide an arrangement and a method for determining positions of the teats of a milking animal in a milking system comprising a robot arm for automatically attaching teat cups to the teats of a milking animal when being located in a position to be milked, and a control device for controlling the movement of said robot arm based on dynamically determined positions of the teats of the milking animal, which arrangement and method are based on stereo vision and solve at least some of the problems of the prior art as set forward above.

It is in this respect a particular object of the invention to provide such an arrangement and such a method, which use a stereoscopic calculation method based on repeatedly recorded pairs of images, wherein for each teat and for each pair of images, conjugate points in the pair of images for the stereoscopic calculation can be found easily, efficiently, and fastly.

It is a further object of the invention to provide such an arrangement and such a method, which are robust, effective, fast, precise, accurate, reliable, safe, easy to use, and of low cost.

It is still a further object of the invention to provide such an arrangement and such a method, which are capable of obtaining a very high number of correct teat cup attachments.

These objects among others are, according to the present invention, attained by arrangements and methods as claimed in the appended patent claims.

In example embodiments, said image processing device is provided, in the later stage when the robot arm is close to attach the teat cup to the teat of the milking animal, to repeatedly determine the relative position of the teat of the milking animal in a coordinate system of the camera pair; and to repeatedly detect the robot arm or the teat cup and determine its relative position in the coordinate system of the first camera pair by said stereoscopic calculation method based on said repeatedly recorded pairs of images.

In example embodiments, wherein camera pair is provided to record a pair of images, wherein several well defined points are located in the common field of vision of the camera pair, the positions of the well defined points being known in the coordinate system of the milking system; and said image processing device is provided to perform an absolute calibration process, in which the positions of the image planes of the cameras of the camera pair are determined in the coordinate system of the milking system to thereby be capable of determining the absolute position of the teat of the milking animal.

In example embodiments, said camera pair is provided to record a pair of images, wherein several well defined points are located in the common field of vision of the camera pair; and said image processing device is provided to perform a relative calibration process, in which the positions of the image planes of the cameras of the camera pair are determined relative to each other to thereby be capable of determining the position of the teat of the milking animal relative to another measured position.

In example embodiments, a method for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said method being characterized by the steps of: directing a first camera pair towards the teats of the milking animal when being located in the position to be milked;

repeatedly recording pairs of images by the first camera pair; repeatedly detecting the teats of the milking animal and determining their positions by a stereoscopic calculation method based on said repeatedly recorded pairs of images, wherein the absolute position of a teat of the milking animal is initially determined in a coordinate system of the milking system; and the position of the teat of the milking animal is determined relative to the robot arm or the teat cup repeatedly in a later stage when the robot arm is close to attach a teat cup to the teat of the milking animal, the position of the teat of the milking animal relative to the robot arm or the teat cup being more exact than said absolute position.

In example embodiments, an arrangement for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said arrangement comprising: a camera pair directed towards the teats of the milking animal when being located in the position to be milked, wherein the camera pair is provided to repeatedly record pairs of images; an image processing device provided for repeatedly detecting the teats of the milking animal and determining their positions by a stereoscopic calculation method based on said repeatedly recorded pairs of images, wherein said camera pair is comprised of a pair of thermal or infrared cameras, each responsive to infrared radiation propagating towards the camera.

In example embodiments, a method for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said method being characterized by the steps of: directing a camera pair towards the teats of the milking animal when being located in the position to be milked;

repeatedly recording pairs of images by the camera pair; and repeatedly detecting the teats of the milking animal and determining their positions by a stereoscopic calculation method based on said repeatedly recorded pairs of images, wherein said camera pair is comprised of a pair of thermal or infrared cameras, each responsive to temperatures in the field of vision of the camera; and said repeatedly recorded pairs of images are thermal images.

In example embodiments, an arrangement for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said arrangement comprising: a first camera pair directed towards the teats of the milking animal when being located in the position to be milked, wherein the first camera pair is provided to repeatedly record pairs of images; an image processing device provided for repeatedly detecting the teats of the milking animal and determining their positions by a stereoscopic calculation method based on said repeatedly recorded pairs of images, wherein said first camera pair is mounted below the teats of, and behind, the milking animal when being located in the position to be milked so that said first camera pair is directed diagonally upwards towards the teats of the milking animal when being located in the position to be milked.

In example embodiments, the cameras of said first camera pair are movable relative to the milking system and to the milking animal when being located in a position to be milked, and optionally relative to each other, in order to be capable of reducing the number of failed teat position determinations due to teats being obscured, while pairs of images are recorded, by means of finding positions for said cameras where no teats are obscured.

In example embodiments, the cameras further comprise a third camera mounted adjacent said first camera pair mounted below the teats of, and behind, the milking animal, and directed towards the teats of the milking animal when being located in the position to be milked, for repeatedly record images simultaneously with the recording of said pairs of images, wherein said image processing device is provided for repeatedly detecting the teats of the milking animal and determining their positions by a stereoscopic calculation method based on one of said repeatedly recorded pairs of images and said repeatedly recorded images by said third camera.

In example embodiments, said image processing device is provided for repeatedly detecting the teats of the milking animal and determining their positions by a stereoscopic calculation method based on another one of said repeatedly recorded pairs of images and said repeatedly recorded images by said third camera.

In example embodiments, the arrangement further comprises a second camera pair directed towards the teats of the milking animal when being located in the position to be milked, wherein the second camera pair is provided to repeatedly record pairs of images, wherein said image processing device is provided for repeatedly detecting the teats of the milking animal and determining their positions by a stereoscopic calculation method based on said pairs of images repeatedly recorded by said second camera pair.

In example embodiments, said second camera pair is mounted below the milking animal, particularly in the floor of the milking system, when being located in the position to be milked.

In example embodiments, wherein said second camera pair is mounted at the side of the milking animal when being located in the position to be milked.

In example embodiments, said second camera pair is mounted at a height so that the teats of the milking animal belong to the outer contour of the milking animal in the repeatedly recorded pairs of images.

In example embodiments, said second camera pair is movable vertically in order to be positioned at a height so that the teats of the milking animal belong to the outer contour of the milking animal in the repeatedly recorded pairs of images.

In example embodiments, said image processing device is provided in an initial stage to determine the absolute position of a teat of the milking animal in a coordinate system of the milking system; and said image processing device is provided, in a later stage when the robot arm is close to attach a teat cup to the teat of the milking animal, to repeatedly determine the position of the teat of the milking animal relative to the robot arm or the teat cup, wherein the position of the teat of the milking animal relative to the robot arm or the teat cup is more exact than said absolute position.

In example embodiments, said image processing device is provided, in the later stage when the robot arm is close to attach the teat cup to the teat of the milking animal, to repeatedly determine the relative position of the teat of the milking animal in a coordinate system of the camera pair; and to repeatedly detect the robot arm or the teat cup and determine its relative position in the coordinate system of the first camera pair by said stereoscopic calculation method based on said repeatedly recorded pairs of images.

In example embodiments, said camera pair is provided to record a pair of images, wherein several well defined points are located in the common field of vision of the camera pair, the positions of the well defined points being known in the coordinate system of the milking system; and said image processing device is provided to perform an absolute calibration process, in which the positions of the image planes of the cameras of the camera pair are determined in the coordinate system of the milking system to thereby be capable of determining the absolute position of the teat of the milking animal.

In example embodiments, said camera pair is provided to record a pair of images, wherein several well defined points are located in the common field of vision of the camera pair; and said image processing device is provided to perform a relative calibration process, in which the positions of the image planes of the cameras of the camera pair are determined relative to each other to thereby be capable of determining the position of the teat of the milking animal relative to another measured position.

In example embodiments, a method for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said method being characterized by the steps of: directing a first camera pair towards the teats of the milking animal when being located in the position to be milked; repeatedly recording pairs of images by the first camera pair; repeatedly detecting the teats of the milking animal and determining their positions by a stereoscopic calculation method based on said repeatedly recorded pairs of images, wherein said first camera pair is arranged below the teats of, and behind, the milking animal when being located in the position to be milked; and is directed diagonally upwards towards the teats of the milking animal when being located in the position to be milked.

In example embodiments, an arrangement for determining positions of the teats of a milking animal in a milking system comprising a robot arm for automatically attaching teat cups to the teats of a milking animal when being located in a position to be milked, and a control device for controlling the movement of said robot arm based on determined positions of the teats of the milking animal, said arrangement comprising: a first camera pair directed towards the teats of the milking animal when being located in the position to be milked, wherein the first camera pair is provided to repeatedly record pairs of images; an image processing device provided for repeatedly detecting the teats of the milking animal and determining their positions by a stereoscopic calculation method based on said repeatedly recorded pairs of images, wherein the cameras of said first camera pair are arranged vertically one above the other; and said image processing device is provided, for each teat and for each pair of images, to define the position of the lower tip of the teat contour in the pair of images as conjugate points for said stereoscopic calculation, and to find said conjugate points along a substantially vertical epipolar line.

In example embodiments, said image processing device is provided, for each teat and for each pair of images, to compensate for any deviations caused by the fact that the lower tip of the teak contour in the pair of images corresponds to different objection points on the teat due to different perspective views, in which the pair of images are recorded, by means of creating a mathematical model of the characteristic form of the teat, and to calculate the compensation based on the mathematical-model, the different perspectives, and the distance to the teat.

In example embodiments, said image processing device is provided to determine the positions of the teats of the milking animal, and to calculate the compensation for any deviations caused by the fact that the lower tip of the teat contour in the pair of images corresponds to different objection points on the teat, in an iterative process.

In example embodiments, said first camera pair is mounted below the teats of, and behind, the milking animal when being located in the position to be milked so that said first camera pair is directed diagonally upwards towards the teats of the milking animal when being located in the position to be milked.

In example embodiments, the cameras of said first camera pair are movable relative to the milking system and to the milking animal when being located in a position to be milked, and optionally relative to each other, in order to be capable of reducing the number of failed teat position determinations due to teats being obscured, while pairs of images are recorded, by means of finding positions for said cameras where no teats are obscured.

In example embodiments, the arrangement further comprises a third camera mounted adjacent said first camera pair, and directed towards the teats of the milking animal when being located in the position to be milked, for repeatedly record images simultaneously with the recording of said pairs of images, wherein said image processing device is provided for repeatedly detecting the teats of the milking animal and determining their positions by a stereoscopic calculation method based on one of said repeatedly recorded pairs of images and said repeatedly recorded images by said third camera.

In example embodiments, said image processing device is provided for repeatedly detecting the teats of the milking animal and determining their positions by a stereoscopic calculation method based on another one of said repeatedly recorded pairs of images and said repeatedly recorded images by said third camera.

In example embodiments, the arrangement further comprises a second camera pair directed towards the teats of the milking animal when being located in the position to be milked, wherein the second camera pair is provided to repeatedly record pairs of images, and said image processing device is provided for repeatedly detecting the teats of the milking animal and determining their positions by a stereoscopic calculation method based on said pairs of images repeatedly recorded by said second camera pair.

In example embodiments, said second camera pair is mounted below the milking animal, particularly in the floor of the milking system, when being located in the position to be milked.

In example embodiments, said second camera pair is mounted at the side of the milking animal when being located in the position to be milked.

In example embodiments, said second camera pair is mounted at a height so that the teats of the milking animal belong to the outer contour of the milking animal in the repeatedly recorded pairs of images.

In example embodiments, said second camera pair is movable vertically in order to be positioned at a height so that the teats of the milking animal belong to the outer contour of the milking animal in the repeatedly recorded pairs of images.

In example embodiments, the arrangement further comprises at least one light source provided for illuminating the udder of the milking animal to thereby increase the contrast in the repeatedly recorded pairs of images.

In example embodiments, said light source emits white light.

In example embodiments, said light source emits UV light.

In example embodiments, said light source creates a back lighting for said first camera pair.

In example embodiments, said light source is movable and/or capable of being directed toward different directions.

In example embodiments, the image planes of the cameras of said first camera pair are coplanar.

In example embodiments, said image processing device is provided, for each time the teats are to be detected, to apply a motion detection algorithm to reduce the area in which the teats likely are, wherein the difference between two images recorded one after the other by one camera of said camera pair is analyzed, and the area in which the teats likely are is reduced by discarding areas in the two images wherein substantially no movement has occurred.

In example embodiments, said image processing device is provided to reduce scatter in the reduced area in which the teats likely are by applying a relaxation algorithm.

In example embodiments, said image processing device is provided to enlarge the reduced area in which the teats likely are by a pixel expanding algorithm.

In example embodiments, said camera pair is directed towards the teats of the milking animal when being located in the position to be milked is directed so that the teats of the milking animal belong to the outer contour of the milking animal in the repeatedly recorded pairs of images; and said image processing device is provided to further reduce the area in which the teats likely are by a contour creation algorithm.

In example embodiments, said image processing device is provided, for each time the teats are to be detected, to apply an edge detection algorithm based on the phase congruency model of feature detection to thereby find edges and corners in a recorded pair of images that most likely include those of the teats of the milking animal.

In example embodiments, said image processing device is provided, for each time the teats are to be detected, to apply a Canny detection algorithm to thereby find edges in a recorded pair of images that most likely include those of the teats of the milking animal.

In example embodiments, said image processing device is provided, for each time the teats are to be detected, to apply a labeling algorithm for calculating features of the found edges and corners in the recorded pair of images.

In example embodiments, said image processing device is provided, for each time the teats are to be detected, to apply a hierarchical chamfer matching algorithm for identifying edges and corners of the found edges and corners in the recorded pair of images which belong to the teats of the milking animal based on said calculated features.

In example embodiments, said image processing device is provided in an initial stage to determine the absolute position of a teat of the milking animal in a coordinate system of the milking system; and said image processing device is provided, in a later stage when the robot arm is close to attach a teat cup to the teat of the milking animal, to repeatedly determine the position of the teat of the milking animal relative to the robot arm or the teat cup, wherein the position of the teat of the milking animal relative to the robot arm or the teat cup is more exact than said absolute position.

In example embodiments, said image processing device is provided to automatically detect the condition of the teats, particularly if they are swell up or if injuries and/or dirt subsist on the teats of the milking animal by an image processing method based on said repeatedly recorded pairs of images.

In example embodiments, said injuries are any of wounds, cuts, sores, or red spots.

In example embodiments, said milking system comprises at least one-teat cleaning device capable of cleaning teats of milking animals according to anyone of a plurality of different teat cleaning schemes, said arrangement comprising means provided to select one of said plurality of different teat cleaning schemes for the cleaning of the teats of said milking animal based on said automatic detection of the condition of the teats of said milking animal.

In example embodiments, said image processing device is provided to automatically detect dirt or damages on the lenses of said camera pair by an image processing method based on repeatedly recorded pairs of images.

In example embodiments, said image processing device is provided, for each one of the cameras of said camera pair, to automatically detect dirt or damages on the lens of that camera by an image processing method based on comparisons of repeatedly recorded images by that camera.

In example embodiments, the cameras of said camera pair are rotatable to be capable of being directed towards each other; and said image processing device is provided, for each one of the cameras of said camera pair, to automatically detect dirt or damages on the lens of that camera by an image processing method based on repeatedly recorded images by the other camera.

In example embodiments, a method for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said method being characterized by the steps of: directing a first camera pair towards the teats of the milking animal when being located in the position to be milked;

repeatedly recording pairs of images by the first camera pair; repeatedly detecting the teats of the milking animal and determining their positions by a stereoscopic calculation method based on said repeatedly recorded pairs of images, wherein the position of the lower tip of the teat contour in each pair of images is defined as conjugate points for said stereoscopic calculation; and the cameras of said first camera pair are arranged vertically one above the other, wherein the conjugate points are found, for each teat and for each pair of images, along a substantially vertical epipolar line.

In example embodiments, an arrangement for determining positions of the teats of a milking animal in a milking system comprises a robot arm for automatically attaching teat cups to the teats of a milking animal when being located in a position to be milked, and a control device for, controlling the movement of said robot arm based on determined positions of the teats of the milking animal, said arrangement comprising: a first camera pair directed towards the teats of the milking animal when being located in the position to be milked, wherein the first camera pair is provided to repeatedly record pairs of images; and an image processing device provided for repeatedly detecting the teats of the milking animal and determining their positions by a stereoscopic calculation method based on said repeatedly
recorded pairs of images, wherein said image processing device is provided, for each time the teats are to be detected, to apply a motion detection algorithm to reduce the area in which the teats likely are, wherein the difference between two images recorded one after the other by one camera of said first camera pair is analyzed, and the area in which the teats likely are, is reduced by discarding areas in the two images wherein substantially no movement has occurred.

In example embodiments, said image processing device is provided to reduce scatter in the reduced area in which the teats likely are by applying a relaxation algorithm.

In example embodiments, said image processing device is provided to enlarge the reduced area in which the teats likely are by a pixel expanding algorithm.

In example embodiments, said first camera pair is directed towards the teats of the milking animal when being located in the position to be milked is directed so that the teats of the milking animal belong to the outer contour of the milking animal in the repeatedly recorded pairs of images; and said image processing device is provided to further reduce the area in which the teats likely are by a contour creation algorithm.

In example embodiments, said image processing device is provided, for each time the teats are to be detected, to apply an edge detection algorithm based on the phase congruency model of feature detection to thereby find edges and corners in a recorded pair of images that most likely include those of the teats of the milking animal.

In example embodiments, said image processing device is provided, for each time the teats are to be detected, to apply a Canny detection algorithm to thereby find edges in a recorded pair of images that most likely include those of the teats of the milking animal.

In example embodiments, said image processing device is provided, for each time the teats are to be detected, to apply a labeling algorithm for calculating features of the found edges and corners in the recorded pair of images.

In example embodiments, said image processing device is provided, for each time the teats are to be detected, to apply a hierarchical chamfer matching algorithm for identifying edges and corners of the found edges and corners in the recorded pair of images which belong to the teats of the milking animal based on said calculated features.

In example embodiments, a method for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said method being characterized by the steps of: directing a first camera pair towards the teats of the milking animal when being located in the position to be milked;

repeatedly recording pairs of images by the first camera pair; repeatedly detecting the teats of the milking animal and determining their positions by a stereoscopic calculation method based on said repeatedly recorded pairs of images, wherein a motion detection algorithm is applied each time the teats are to be detected to reduce the area in which the teats likely are, in which the difference between two images recorded one after the other by one camera of said first camera pair is analyzed, and the area in which the teats likely are, is reduced by discarding areas in the two images wherein substantially no movement has occurred.

In example embodiments, an arrangement for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said arrangement comprising: a first camera pair directed towards the teats of the milking animal when being located in the position to be milked, wherein the first camera pair is provided to repeatedly record pairs of images; an image processing device provided for repeatedly detecting the teats of the milking animal and determining their positions by a stereoscopic calculation method based on said repeatedly
recorded pairs of images, wherein said image processing device is provided, for each time the teats are to be detected, to apply an edge detection algorithm based on the phase congruency model of feature detection to thereby find edges and corners in a recorded pair of images that most likely include those of the teats of the milking animal.

In example embodiments, said image processing device is provided, for each time the teats are to be detected, to apply a Canny detection algorithm to thereby find edges in a recorded pair of images that most likely include those of the teats of the milking animal.

In example embodiments, said image processing device is provided, for each time the teats are to be detected, to apply a labeling algorithm for calculating features of the found edges and corners in the recorded pair of images.

In example embodiments, said image processing device is provided, for each time the teats are to be detected, to apply a hierarchical chamfer matching algorithm for identifying edges and corners of the found edges and corners in the recorded pair of images which belong to the teats of the milking animal based on said calculated features.

In example embodiments, a method for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said method being characterized by the steps of: directing a first camera pair towards the teats of the milking animal when being located in the position to be milked;

repeatedly recording pairs of images by the first camera pair; repeatedly detecting the teats of the milking animal and determining their positions by a stereoscopic calculation method based on said repeatedly recorded pairs of images, wherein an edge detection algorithm based on the phase congruency model of feature detection is applied each time the teats are to be detected to thereby find edges and corners in a recorded pair of images that most likely include those of the teats of the milking animal.

In example embodiments, an arrangement for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said arrangement comprising: a first camera pair directed towards the teats of the milking animal when being located in the position to be milked, wherein the first camera pair is provided to repeatedly record pairs of images; an image processing device provided for repeatedly detecting the teats of the milking animal and determining their positions by a stereoscopic calculation method based on said repeatedly recorded pairs of images, wherein said image processing device is provided to automatically detect a condition of the teats of the milking animal by an image processing method based on said repeatedly recorded pairs of images.

In example embodiments, said image processing device is provided to automatically detect injuries and/or dirt on the teats of the milking animal by an image processing method based on said repeatedly recorded pairs of images.

In example embodiments, said injuries are any of wounds, cuts, sores, or red spots.

In example embodiments, said image processing device is provided to automatically detect if a teat of the milking animal is swell up by an image processing method based on said repeatedly recorded pairs of images.

In example embodiments, said milking system comprises at least one teat cleaning device capable of cleaning teats of milking animals according to anyone of a plurality of different teat cleaning schemes, said arrangement comprising means provided to select one of said plurality of different teat cleaning schemes for the cleaning of the teats of said milking animal based on said automatic detection of the condition of the teats of said milking animal.

In example embodiments, said image processing device is provided to automatically detect dirt or damages on the lenses of said first camera pair by an image processing method based on repeatedly recorded pairs of images by said first camera pair.

In example embodiments, said image processing device is provided, for each one of the cameras of said first camera pair, to automatically detect dirt or damages on the lens of that camera by an image processing method based on comparisons of repeatedly recorded images by that camera.

In example embodiments, the cameras of said first camera pair are rotatable to be capable of being directed towards each other; and said image processing device is provided, for each one of the cameras of said first camera pair, to automatically detect dirt or damages on the lens of that camera by an image processing method based on repeatedly recorded images by the other camera.

In example embodiments, a method for determining positions of the teats of a milking animal in a milking system comprises a robot arm for automatically attaching teat cups to the teats of a milking animal when being located in a to be milked, and a control device for controlling the movement of said robot arm based on determined positions of the teats of the milking animal, said method being characterized by the steps of: directing a first camera pair towards the teats of the milking animal when being located in the position to be milked;

repeatedly recording pairs of images by the first camera pair; repeatedly detecting the teats of the milking animal and determining their positions by a stereoscopic calculation method based on said repeatedly recorded pairs of images, wherein injuries and/or dirt on the teats of the milking animal are automatically detected by an image processing method based on said repeatedly recorded pairs of images.

In example embodiments, an arrangement for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said arrangement comprising: a first camera pair directed towards the teats of the milking animal when being located in the position to be milked, wherein the first camera pair is provided to repeatedly record pairs of images; an image processing device provided for repeatedly detecting the teats of the milking animal and determining their positions by a stereoscopic calculation method based on said repeatedly recorded pairs of images, wherein said image processing device is provided to automatically detect dirt or damages on the lenses of said first camera pair by an image processing method based on repeatedly recorded pairs of images by said first camera pair.

In example embodiments, said image processing device is provided, for each one of the cameras of said first camera pair, to automatically detect dirt or damages on the lens of that camera by an image processing method based on comparisons of repeatedly recorded images by that camera.

In example embodiments, the cameras of said first camera pair are rotatable to be capable of being directed towards each other; and said image processing device is provided, for each one of the cameras of said first camera pair, to automatically detect dirt or damages on the lens of that camera by an image processing method based on repeatedly recorded images by the other camera.

In example embodiments, a method for determining positions of the teats of a milking animal in a milking system comprises a robot arm for automatically attaching teat cups to the teats of a milking animal when being located in a position to be milked, and a control device for controlling the movement of said robot arm based on determined positions of the teats of the milking animal, said method being characterized by the steps of: directing a first camera pair towards the teats of the milking animal when being located in the position to be milked; repeatedly recording pairs of images by the first camera pair; repeatedly detecting the teats of the milking animal and determining their positions by a stereoscopic calculation method based on said repeatedly recorded pairs of images, wherein dirt or damages on the lenses of said first camera pair is/are automatically detected by an image processing method based on repeatedly recorded pairs of images by said first camera pair.

Further characteristics of the invention and advantages thereof, will be evident from the following detailed description of preferred embodiments of the present invention given hereinafter and the accompanying FIGS. 1-8, which are given by way of illustration only and are thus not limitative of the present invention.

BRIEF DESCRIPTION OF THE DRAWINGS

FIGS. 1, 3 and 4 are perspective views, whether FIG. 2 is a top view. The milking station is only schematically outlined in FIGS. 2-4.

FIG. 5 is a schematic diagram illustrating various image processing methods, among them methods included in further preferred embodiments of the present invention.

DETAILED DESCRIPTION OF EMBODIMENTS

The outline of this description is as follows. Firstly, a milking system wherein arrangements and methods for determining positions of the teats of a cow according to the present invention may be implemented is overviewed. Thereafter, various camera arrangements as used in the invention are considered. The following four sections are mainly devoted to image processing. The first of these sections deals with image processing in general and teat detection in particular. Thereafter, stereoscopic calculation methods for determining teat positions are considered. The following section deals with various calibration methods used in the invention. Finally, image processing methods for obtaining further functionality are disclosed.

1. The Milking System

Figure 1:
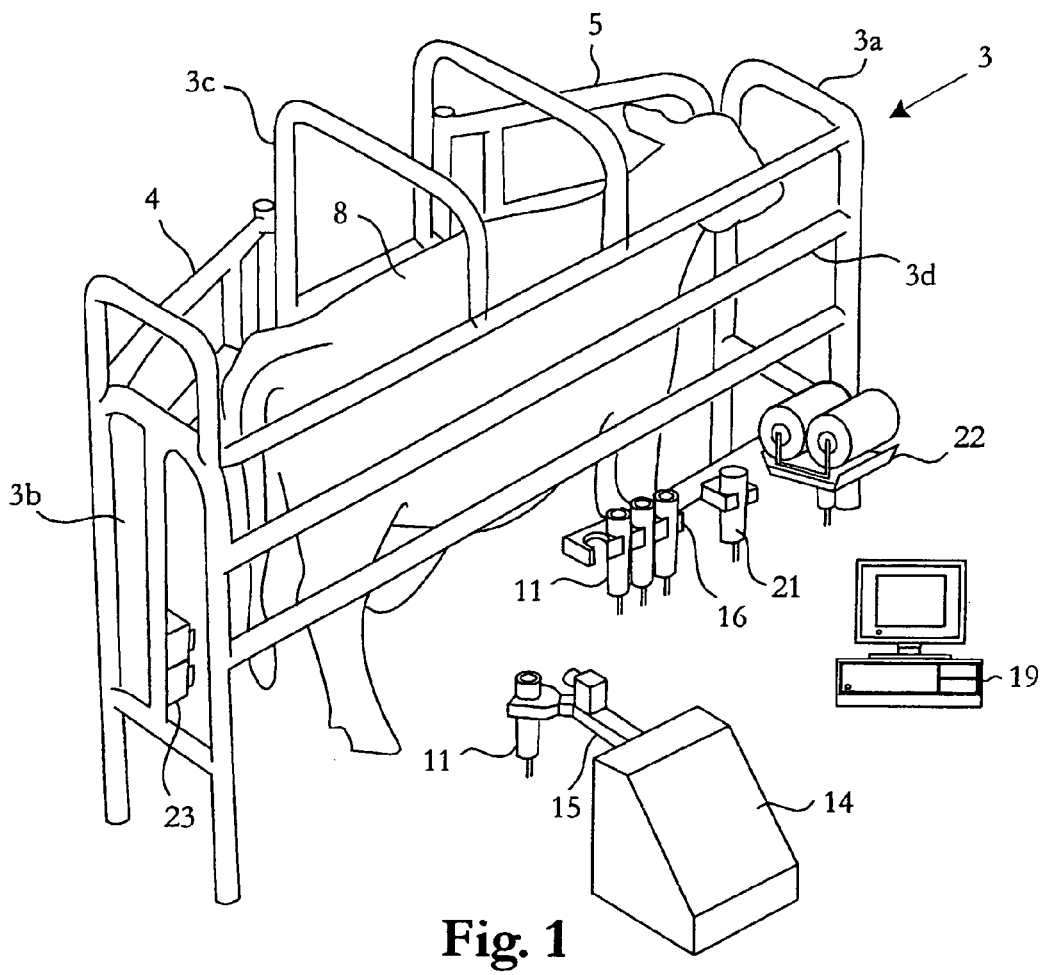
FIGS. 1-4 display each schematically an automated milking station including an arrangement for determining positions of the teats of a milking animal according to a respective preferred embodiment of the present invention.

In FIG. 1 is shown a milking system or station 3 arranged for voluntary milking of freely walking animals such as e.g. cows, i.e. the animals enter the milking station 3 in order to be milked on a voluntary basis. The milking station 3 comprises an enclosure having an inlet gate 4 and an outlet gate 5, which are both capable of being opened automatically. The front end of the milking station 3 is denoted by 3a, the back end is denoted by 3b, the left side is denoted by 3c and the right side is denoted by 3d.

The milking station 3 comprises further an automatic milking machine (not explicitly illustrated) including teat cups 11 connected to an end unit by means of milk lines (only the portions attached to the teat cups 11 are shown in FIG. 1). The milking station further includes a milking robot or automatic handling device 14 having a robot arm 15 provided with a gripper. The milking robot 14 is arranged to automatically apply the teat cups 11 of the milking machine to the teats of a cow 8 present in the milking station 3 prior to milking. In FIG. 1 three of the teat cups 11 are arranged in a teat cup rack or magazine 16, whereas the fourth one is held by the gripper of the robot arm 15.

Typically, a teat cleaning device including e.g. a teat cleaning cup 21 or brushes 22 may be provided for cleaning the teats of the cow 8 prior to milking.

Further, the milking station 3 comprises an identification member provided to identify a cow approaching the milking station 3, and a central processing and control device 19, which is responsible for central processing and controlling of the animal arrangement, which inter alia includes the initiation of various activities in connection with the milking such as e.g. opening and closing of the gates 4 and 5, and control of the milking machine and its handling device 14. The central processing and control device 19 comprises typically a microcomputer, suitable software, and a database including information of each of the cows milked by the milking machine, such as e.g. when the respective cow was milked last time, when she was fed last time, her milk production, her health, etc.

A cow approaching the milking station is thus identified by the identification member, and the central processing and control device 19 may then, depending on the identification, give the cow access to the milking station 3 by means of opening the inlet gate 4. The teats may be cleaned by the teat cleaning device, after which the teat cups 19 are applied to the teats of the cow 8 in the milking station 9 under control of the central processing and control device 19.

The attachment is enabled by means of locating the teats of the cow 8 by a camera pair 23 directed towards the teats of the cow 8 when being located in the position to be milked. The camera pair 23 is provided to repeatedly record pairs of images and may for instance comprise two CCD or video cameras. The central processing and control device 19 or other control or image processing device detects repeatedly the teats of the cow 8 and determines their positions by a stereoscopic calculation method based on the repeatedly recorded pairs of images. This position information is used by the central processing and control device 19 to send signals to the milking robot to move the robot arm to each teat after having gripped a respective teat cup.

Note that the robot arm 5 also has to move the teat cleaning cup 21 or the brushes 22 to the teats of the cow 8. This may be performed in the very same manner as the teat cups are moved.

During milking, milk is drawn from the teats of the cow 8 by means of vacuum being applied to the teat cups 11 via the milk lines, and the milk drawn is collected in the end unit. After the milking has been completed the teats of the cow may be subjected to after treatment, e.g. a spray of disinfectant, and then the outlet gate 5 is opened and the cow 8 may leave the milking station 3.

2. The Camera Arrangement

The location and orientation of the camera pair are very important features. The task is to design an arrangement that should be capable of detecting and locating every teat for each cow. Firstly, all teats must be seen by the cameras used. Secondly, the teats must be visualized in a manner that makes the image analysis easier. The implementation should also strive to maintain a low-cost profile in order to enable potential industrial production at the same cost as the prior art systems used today.

In the preferred embodiment of FIG. 1, the camera pair 23 is mounted below the teats of the cow 8 and behind the cow when being located in the position to be milked so that the camera pair 23 is directed diagonally upwards towards the teats of the cow 8 when being located in the position to be milked. The immediate position behind the cow 8 is in terms of image analysis a good location. The teats would be close to the cameras and by placing the cameras below the udders, directed diagonally upwards, both high and low udders can be detected in most cases. A typical distance between the camera pair 23 and the teats of the cow 8 is 30 cm. A further advantage of this camera position is that the cameras will not be in the way of the robot arm 15 or the inlet gate 4.

The camera pair 23 may be movable up and down, depending on the height of the udder, to attain a good contrast between the teats and background simply by moving the camera pair up or down.

Figure 2:
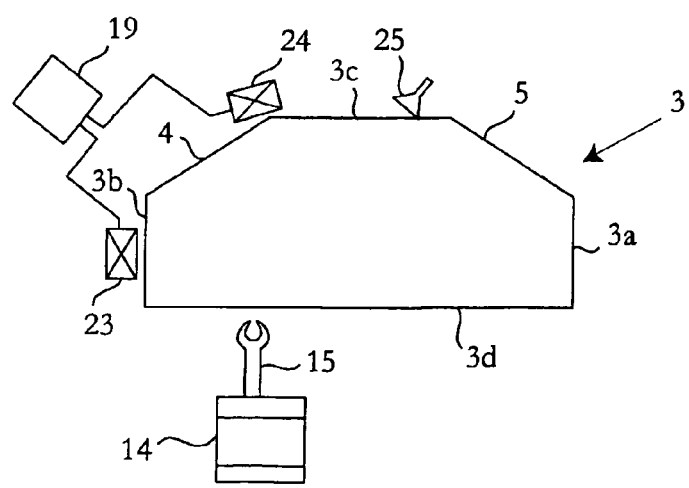

In the preferred embodiment of FIG. 2, a first 23 and a second 24 camera pairs are directed towards the teats of the cow when being located in the position to be milked, wherein the each camera pair 23, 24 is provided to repeatedly record pairs of images, and an image processing device is provided for repeatedly detecting the teats of the cow and determining their positions by a stereoscopic calculation method based on the pairs of images repeatedly recorded by each of the camera pairs 23, 24. The first camera pair 23 is arranged behind the cow, whereas the second camera pair is arranged at the side of the cow. A typical distance between the second camera pair 24 and the teats of the cow is 80 cm.

At least two camera pairs may be necessary to obtain a high number of successful teat cup attachments. This is because the teats can occlude each other. More camera pairs may also relax the demands on the image processing.

Figure 3:
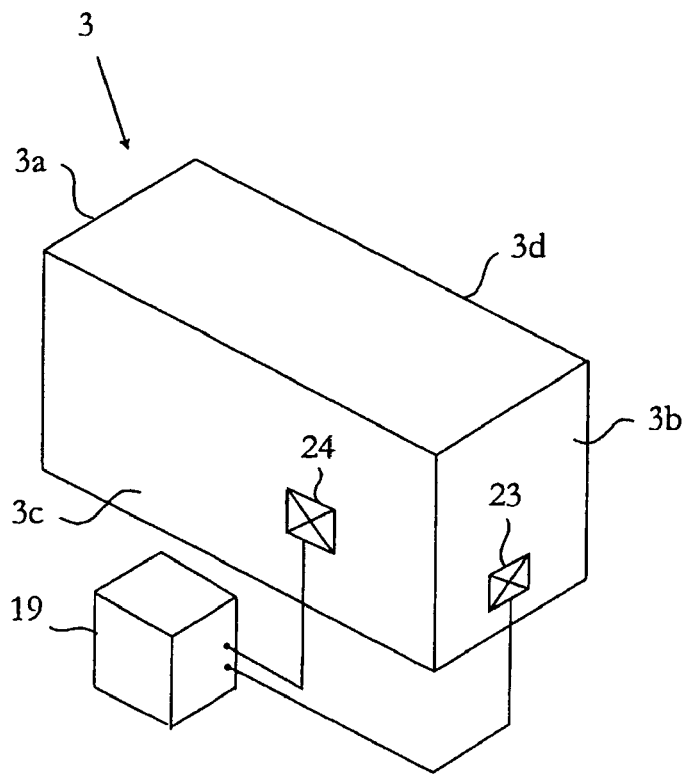

The preferred embodiment of FIG. 3 differs from the embodiment of FIG. 2 in that the second camera pair 24 is mounted at a height so that the teats of the cow will belong to the outer contour of the cow in the repeatedly recorded pairs of images by that camera pair 24. Such measures would facilitate image processing considerably. The second camera pair 24 is preferably movable vertically in order to be positioned at a height so that the teats of the cow will belong to the outer contour of the cow in the repeatedly recorded pairs of images. Different cows have their udders at different heights and in order to secure that a teat contour is recorded the camera pair 24 should be movable in the vertical plane.

The preferred embodiments of FIGS. 2-3 would not only improve the detection rate of the system but would also give more reliable stereo calculations since distance calculations from two independent systems would be used.

The movable cameras could be trained for each cow or be trained the first time a cow enters the milking station 3. The result could be stored in a database and be updated after each milking. Thus, by having the possibility to move the cameras of the camera pairs relative to the milking station 3 and to the cow when being located in a position to be milked, and optionally relative to each other, the number of failed teat position determinations due to teats being obscured can be reduced.

Figure 4:
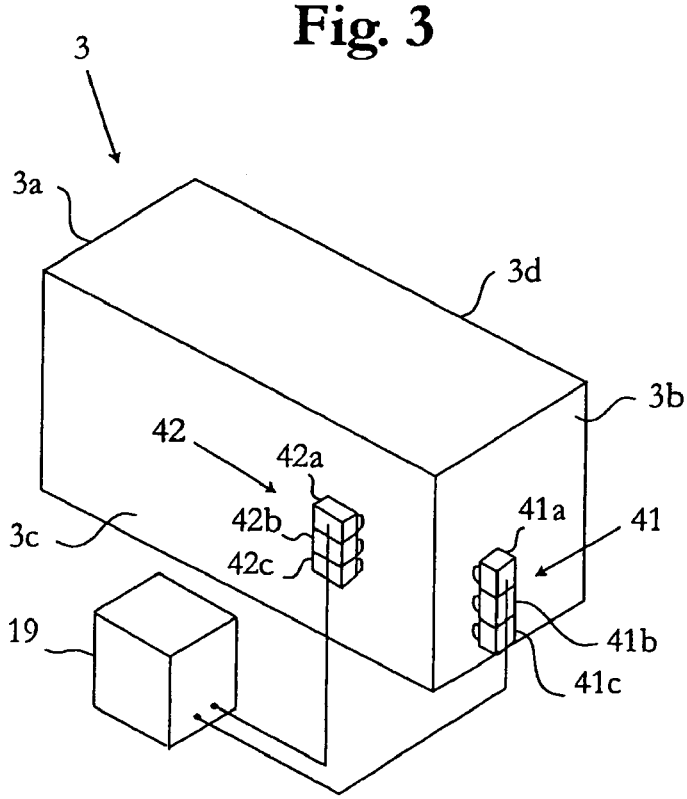

The preferred embodiment of FIG. 4 differs from the embodiment of FIG. 3 in that each of the two camera pairs, here denoted by 41 and 42, comprises three cameras 41a-c and 42a-c. By such a stereo vision system three stereoscopic position calculations can be made for each camera pair 41, 42, and thus in total six calculations can be made provided that each camera 41a-c and 42a-c can see the teat in question. It would of course be even better to use even more camera pairs to achieve even further stereoscopic position calculations, or at least render it most likely that two cameras in one camera pair can always detect a teat of a cow.

According to yet a preferred embodiment of the invention, the camera pair is located straight below the cow's udder, and the cameras are directed upwards. For instance the camera pair may be located in the floor of the milking station behind a translucent protecting window provided with cleaning means such as wipers. The camera pair together with the protecting window could be raised by a telescopic arrangement to be positioned closer to the teats of the cow. Such camera pair would always be capable of detecting all four teats of the cow. However, the position is extremely vulnerable for dirt and damages.

It shall be noted that the cameras of each camera pair in the preferred embodiments described above are advantageously arranged vertically one above the other. The image processing device may then, for each teat and for each pair of images, define the position of the lower tip of the teat contour in the pair of images as conjugate points for the stereoscopic calculation, and find the conjugate points along a substantially vertical epipolar line. This increases the accuracy and precision of the teat position determination considerably. This is discussed in detail in section 5 with reference to FIGS. 6 and 7.

Further, the cameras of each camera pair are arranged so that the image planes of the cameras of each camera pair are coplanar. This is not a prerequisite for the stereoscopic calculations, but it facilitates the same.

The cameras are typically video cameras or solid state cameras such as e.g. CCD cameras sensitive to visible light. Thus, neither the choice of location nor the indoor/outdoor lighting should affect the performance of the stereo vision system. Lightning is an issue of both suppressing natural light differences and enhancing the image quality to facilitate image analysis.

The milking station 3 is typically arranged in a barn. Therefore, an artificial light source particularly provided for illuminating the udder of the cow to thereby increase the contrast in the repeatedly recorded pairs of images may be needed and used.

In the preferred embodiment of FIG. 2, a light source 25 is provided, which may emit white light, colored light or UV light. In order to obtain a good contrast between the teats and the udder or other kind of background, the light source 25 ought to create a back lighting or sidelight for each camera pair. In FIG. 2 the light source 25 is arranged at a low position at the left side 3c of the milking station, but further ahead of the second camera pair 24. The light is directed backwards and diagonally upwards toward the teats of the cow. Thus, a back lighting is obtained for the first camera pair 23 and a sidelight is obtained for the second camera pair 24.

The light source 25 could be movable and capable of being directed toward different directions in order to find an appropriate illumination of the teats of the cow.

An external light source for the particular purpose of illuminating the teats of the cow is preferred but not compulsory. However, if such light source is not used image analysis has to be used to counteract various lightning effects. Methods that can be used include e.g. histogram equalization, a method used to divide the grey levels equally within the entire range. However, since both color and texture of the teats are similar to the surface of the udder the contrast between them may in some instance be too low.

Alternatively, or additionally, thermal cameras are provided for visualizing the natural infrared radiation from the cow (as compared to the radiation from surrounding objects). Thus, images of the temperature radiation emitted from objects in front of the cameras are captured. No external light sources are needed and problems with scattered and stray light are avoided. Further, the thermal cameras can be used during conditions of low levels of light and even in complete darkness, e.g. during night time. So-called active thermal cameras wherein reflected infrared or other radiation is used for visualization is a further option for the present invention.

3. Image Processing: Teat Detection

Fundamental steps in image processing include the following different processing steps.

Pre-processing
Segmentation
Representation and description
Classification

The first step is pre-processing. This stage aims to enhance the image by removing noise or distortions. The main idea is to increase the chances to have success in the later processing steps by apply methods to suppress some data and to enhance other. Common techniques are transformations for enhanced contrast and noise removal. The transformations can be combinations of smoothing, different edge detectors or logical operations.

Next, there is a group of processing techniques commonly referred to as segmentation. These techniques intend to divide a digital image into objects, i.e. "interesting areas", and background.

Once the image is divided into objects and background the objects need to be described using descriptors. These descriptors could be size, grey levels, roundness etc. Simultaneously as the descriptors are calculated each object is given a unique identification number called a label. This step is referred to as representation and description.

Finally, a classification algorithm is applied to the object list. This is a way to use object information to associate the objects with objects in the milking station which have been imaged by the camera pair. Typically, some pre-knowledge of the images recorded is needed to create a good classification algorithm. The pre-knowledge is important in image analysis, not just for the classification step. The more information available regarding a specific type of images, the better the image analysis can be made.

In order to accurately detect teats, an automatic method has do be created. The accuracy of the detection system should preferably be no less than prior art systems of today. To solve such a complex problem it is necessary to divide it into smaller processing steps described above. FIG. 5 shows various methods that can be used for teat detection and to which of the processing steps they belong. The most preferred methods are indicated in FIG. 5 and outlined below.

Mean filtering is a blurring pre-processing method, which softens sharp areas in an image. If used properly it could remove noise from the image and potentially improve the image before it is processed by other methods. The method uses the spatial relationship of pixels to smooth an image. A filter mask of size M×N pixels is applied. A pixel, usually the center pixel, in that mask achieves a new pixel value, which represents the mean value of the pixel values within the mask. The bigger the filter mask the more the image is blurred.

Motion detection is a pre-processing method for removal of superfluous information in the images by utilizing the cow's movement. Two images are recorded after one another, with a small time difference, the fact that the grey level values will have changed were movement has occurred is utilized in the method. Since a cow never is stationary, because of breathing or balance correction the time between the two consecutive images can be small.

A black and white image is created, where white pixels represent important areas (i.e. areas where the cow's udder likely is) and black pixels represent uninteresting background areas. This is performed by changing pixels to white in areas were the absolute value of $pixel_{image1} - pixel_{image2}$ exceeds a given constant and every other pixel is changed to black. Such a template image will be used to extract the interesting areas in the original image. Since the binary template image is scattered, it needs further processing to be useful. A good manner to remove scatter is to relax the image. A relaxation method gives the center pixel, in a neighborhood, the value of the most occurring value in that neighborhood. The larger the neighborhood is, the coarser the image becomes.

Since it is critical to include the udder area in the final image it is a good idea to increase the white area in the template by a pixel expanding algorithm. This could be done by dividing the image into K×L squares, with an actual size of M×N and changing the pixels of the entire area to white if there is any occurrence of white pixels inside the area.

If the teats are located in the outer part of the cow's contour, all other remaining information about the cow is here superfluous. This information is removed by applying a method, which is called contour creation. Contour creation firstly copies the black and white template image and then performs a number of binary erosions on the copy. The result is a smaller copy of the original, where every white area has shrunk. By subtracting the shrunken image from the original template image, the result is an image with white bands around the contour of the cow.

By combining this band template image with the originally recorded image and exchanging every white pixel with its corresponding grey pixel, an image with a band of grey levels is created. This image is further processed.

This last step can typically not be applied fully to images taken from the rear position since the teats in those images are not part of the outer contour of the cow. By only using the first three steps of the motion detection method background areas are removed from the image, which still reduces the amount of data considerably.

Thus, according to the present invention, an image processing device is provided to perform any of the above mentioned steps to reduce the area in which the teats likely are.

Experiments have shown that the phase plays an important role in the perception of visual features. The most common features in images consist of combinations of steps, roofs and ramp profiles as well as mach band effects. There is no single linear feature detector that can detect those combinations. But by using the phase component of the Fourier Transform these features can be extracted. The phase plays a decisive role in the perception of visual features. If a human was asked to draw a sketch of the image, localizing precisely the edges or markings of interest as seen in the scene, then chosen points would be those where there is maximal order in the phase components of a frequency-based representation of the signal. Unfortunately, the phase congruency model is hard to implement but could be approximated with local energy in a signal. So instead of searching for local maxima in the phase congruency function, local maxima in the local energy function should be found.

The outputs of this method are two images, one containing magnitude and one orientation of the features. So the phase congruency feature detector is therefore suitable to be used in combination with a canny edge detection algorithm, see below. One issue that needs to be handled is that in combination with the motion detection method erroneous edges will be created where data has been removed. Since removed data is represented as black sections within the image, edges will occur in the contact area between the black edge and the important data area.

Thus, according to the present invention, an image processing device is provided, for each time the teats are to be detected, to apply an edge detection algorithm based on the phase congruency model of feature detection to thereby find edges and corners in a recorded pair of images that most likely include those of the teats of the cow.

A preferred edge-detection method is a Canny detection algorithm.

Next, a representation and description processing method is applied for calculating features of the edges and corners found in the recorded pair of images. Preferably, a labeling algorithm, such as a connected-components labeling method, and a feature vector method are used.

Finally, a classification method is applied for identifying edges and corners of the found edges and corners in the recorded pair of images which belong to the teats of the cow based on the calculated features. The classification method includes typically a low-level classification algorithm and a high-level classification algorithm such as a hierarchical chamfer matching algorithm.

4. Image Processing: Calibration

If stereo vision is to be useful, calibration is a decisive component. Stereo vision or stereoscopic calculation strongly relies on accuracy in calibration and measurements.

The basic idea is built on the ideal case: a pinhole camera that is perfectly aligned. This is not the case in reality. To calculate scene point coordinates, additional information is needed. There are the camera constant and the baseline distance. In reality the relative position of the cameras differs more than just the baseline displacement. The camera also has other important parameters other than the camera constant. The image center can be displaced and there are probably many types of distortions in the image. There are for example radial distortion and de-centering distortion. Radial distortion is seen as a scene point being imaged closer or further out from the image centre than it should have been. This distortion is dependent on the distance from the image center.

The camera intrinsic parameters are collected with the interior calibration. This gives the actual image center and other distortions parameters. These are calculated to be able to reconstruct the actual image.

Before the resulting images can be used and distance calculations can be done, the relation between the camera positions has to be determined. This is achieved by relative calibration. Here both parameters that describe the rotation and displacement are estimated.

If the calculated distance to a scene point should be useful, its relation to another coordinate system is significant. The absolute calibration is used to determine this relation, both rotation and transformation, between two coordinate systems. In this case the relation between a stereo vision system and the robot coordinate system is of interest.

It has been found experimentally that absolute calibration is much more difficult than relative calibration, and that much more reference points in the milking station are needed. Further, the stereo vision system must be continuously calibrated due to movements and other disturbances, which do occur in the milking station, and which affects calibration points placed therein. The accuracy of the calibration points must be 10 times higher then the accuracy demand on the teat positioning. The parameters needed in the stereo calculation, is the position and rotation of both cameras in the milking station coordinate system, the image center and the radial and de-centering distortion factors.

Due to the difficulties obtained when performing absolute calibration to obtain highly accurate absolute teat positions, the present invention proposes a manner of operation, which remedies this problem.

An image processing device is provided in an initial stage of a teat cup attachment to roughly determine the absolute position of a teat of the cow in a coordinate system of the milking station, by aid of which the robot may fetch a teat cup and move it to a position close to a teat of the cow present in the milking station. The image processing device is then provided, i.e. in a later stage of the teat cup attachment when the robot arm is close to attach the teat cup to the teat of the cow, to repeatedly and accurately determine the position of the teat of the cow relative to the robot arm or the teat cup. Thus, the position of the teat of the cow relative to the robot arm or the teat cup is more exact than what the absolute position can be measured.

The image processing device is provided, in the later stage when the robot arm is close to attach the teat cup to the teat of the cow, to repeatedly determine the relative position of the teat of the cow in a coordinate system of the camera pair used, and to repeatedly detect the robot arm or the teat cup and determine its relative position in the coordinate system of the camera pair by the stereoscopic calculation method of the present invention.

During each absolute calibration, the camera pair is provided to record a pair of images, wherein several well defined points are located in the common field of vision of the camera pair, the positions of the well defined points being known in the coordinate system of the milking station, and the image processing device is provided to perform an absolute calibration process, in which the positions of the image planes of the cameras of the camera pair are determined in the coordinate system of the milking system to thereby be capable of determining the absolute position of the teat of the cow.

Similarly, during each relative calibration, the camera pair is provided to record a pair of images, wherein several well defined points are located in the common field of vision of the camera pair, and the image processing device is provided to perform a relative calibration process, in which the positions of the image planes of the cameras of the camera pair are determined relative to each other to thereby be capable of determining the position of the teat of the cow relative to another measured position.

Advantageous by this process is that a very fast and accurate teat cup attachment is enabled, while no extremely high demands are put on the calibration process.

5. Image Processing: Stereo Calculation

Once the teats of the cow have been detected their positions have to be determined by a stereo vision or stereoscopic calculation method. Stereo vision is the recovery of three-dimensional information of a scene from multiple images of the same scene. Stereo vision in computer systems tries to copy the human way when calculating distance. The principle is based on triangulation. Points on the surface of objects are imaged in different relative positions in the images recorded depending on their distance from the viewing system. The basic model is two ideal pinhole cameras viewing the same scene, only with a baseline distance separating them. The image plane should preferably be coplanar, which means that there is no relative rotation between the cameras.

In order to compute the best baseline distance for a system a number of parameters are to be considered. Camera positions, type of cameras, image area, relative positions, milking station constraints and distance-accuracy demands. The baseline is therefore a trade-off of the mentioned parameters. Measurements have shown that a baseline distance of about 5-20 cm would be a suitable choice. Further investigations have shown that the baseline distance should be about ⅕ of the distance from the cameras to the object of interest. The camera pair placed on the side of the milking station would then have a baseline distance of approximately 80/5 cm=16 cm. The rear camera pair behind the cow is closer to the object and should have a baseline distance of about 30/5 cm=6 cm. If the disparity increases the probability of finding and detecting the conjugate pair decreases.

One scene point is imaged in different locations in a first image and a second image recorded by differently placed cameras. The scene point in the first image plane and in the second image plane are both placed on the epipolar line and is called a conjugate pair or conjugate point. The epipolar line is the line that connects the scene point in the first and second images. If the scene point is found in the first image, the scene point in the second image is on the epipolar line. In the ideal model this means that if the cameras are arranged horizontally side by side the first and second image points are on the same image row. Conjugate points are a pair of image coordinates, one from each image, which are each a projection from the same point in space onto the respective image plane. The displacement between the image points is called the disparity and will finally give the depth information.

For the stereo vision calculations the choice of the points that constitutes the conjugate pair is important. They have to represent interesting measuring points and should not result bring any additional error to the distance errors. The conjugate points should also be easy to find.

According to the invention the position of the lower tip of the teat contour in the pair of images is defined as conjugate points.

Figure 6:
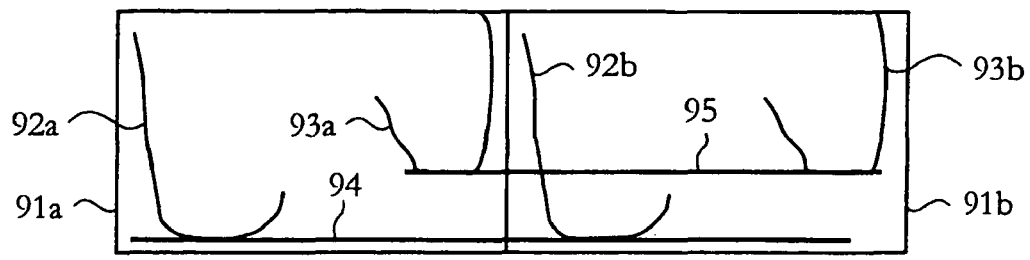
FIGS. 6-7 are each a pair of images as taken by a camera pair as comprised in any of the arrangements shown in FIGS. 1-4 and illustrate yet a preferred embodiment of the invention.

The usual manner to model a stereo vision system is to have a horizontal displacement of the cameras. FIG. 6 shows a pair of images 91a-b as taken by a camera pair mounted horizontally side by side. The contour images of the teats are denoted 92a and 93a in the left hand image 91a, and 92b and 93b in the right hand image 91b. The epipolar lines are denoted by 94 for the teat images 92a-b and by 95 for the teat images 93a-b. This would result in difficulties to find the conjugate points because the lines representing the lower tips of the teat contours are essentially horizontal and the epipolar lines are horizontal. Since these lines are almost parallel it is difficult to select a correct conjugate point.

Figure 7:
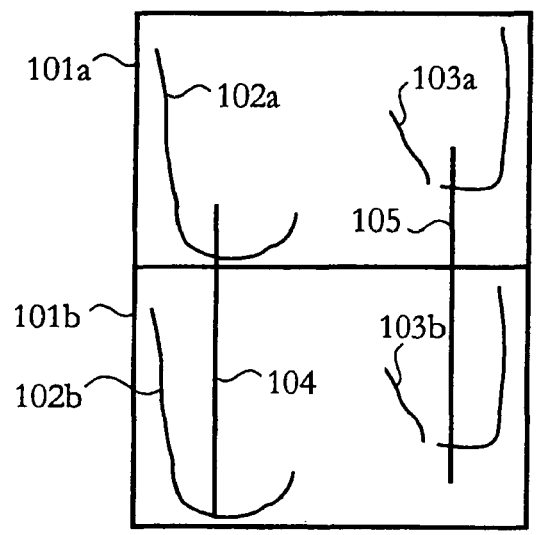

According to a preferred embodiment of the present invention, the cameras of each camera pair are arranged vertically one above the other as has been disclosed in section 2 above. FIG. 7 shows a pair of images 101a-b as taken by a camera pair mounted vertically one above the other. The contour images of the teats are denoted 102a and 103a in the upper image 101a, and 102b and 103b in the lower image 91b. The epipolar lines are denoted by 104 for the teat images 102a-b and by 105 for the teat images 103a-b.

Through this arrangement of the cameras, the epipolar lines become orthogonal to the lines representing the lower tips of the teat contours. This will increase the accuracy and simplifies the conjugate point detection.

Additional information or conjugate points may be needed. This can be achieved by selecting further points on the lines representing the lower tips of the teat contours. The teats internal orientation will indicate on which teat line the conjugate point is to be found. The thickness and teat angle are two interesting parameters. These parameters should not be difficult to extract from the teat tip lines.

In stereovision systems different kinds of occlusion occur. Depending on the cameras relative positions the two images from a stereo-camera pair differ. One teat can be visible in one image but bee partly or fully occluded in the other stereo-image pair. Another issue is the fact that edges from a teat visualized in two images, are in fact not the same physical edge.

Figure 8:
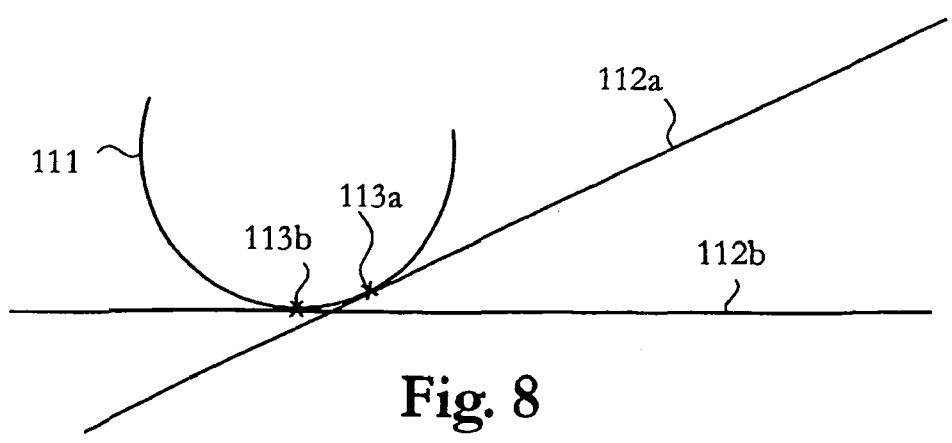
FIG. 8 is a side view of the lower part of a teat of a milking animal illustrating self-occlusion, a phenomenon which is compensated for by still a preferred embodiment of the invention.

FIG. 8 is a side view of the lower part of a teat of a milking animal illustrating self-occlusion. The teat tip 111 is modeled as a half sphere. Two projection lines 112a and 112b from cameras at different heights illustrate the fact that the lower tip of the teat contour in the images recorded by the cameras at different height does not correspond to the same physical scene point on the teat of the cow. In the image by the upper camera point 113a will be recorded as the lower tip of the teat contour, whereas in the image by the lower camera point 113b will be recorded as the lower tip of the teat contour. This leads inevitably to errors in the calculation of the positions of the teats.

The phenomenon which may be compensated for, by still a preferred embodiment of the invention. An image processing device can be provided, for each teat and for each pair of images, to compensate for any deviations caused by the fact that the lower tip of the teat contour in the pair of images corresponds to different objection or scene points on the teat due to different perspective views, in which the pair of images are recorded, by means of creating a mathematical model of the characteristic form of the teat, and to calculate the compensation based on the mathematical model, the different perspectives, and the distance to the teat.

The exact distance to the teat is typically unknown, whereupon the image processing device can be provided to determine the positions of the teats of the milking animal, and to calculate the compensation for any deviations caused by the fact that the lower tip of the teat contour in the pair of images corresponds to different objection points on the teat, in an iterative process, wherein better teat positions and better compensation can be obtained for each iteration.

6. Image Processing: Further Functions

When using a stereo vision camera system it is possible to expand the functionality to more than locating teats and robot arms or teat cups. For instance, an image processing device can be provided to automatically detect injuries and/or dirt on the teats of the cow by an image processing method based on one or several of the repeatedly recorded pairs of images. A single image could be used to discover visual defects, such as redness, cuts, sores or wounds, on the teats and the udders of the cows. The camera system may also surveillance the milking process or inspect almost any part of the milking station. This would be easier if the cameras could be rotated independently of each other.

Furthermore, the teat cleaning device of the milking station may be designed to be capable of cleaning teats of cows according to anyone of a plurality of different teat cleaning schemes, and then one of the plurality of different teat cleaning schemes can be selected for the cleaning of the teats of the cow based on the automatic detection of injuries and/or dirt on the teats of the cow. Teat cleaning can in this manner not only be performed on a cow individual basis but also on a teat individual basis.

The stereo vision system can also be used to create 3D images of objects. In those images the teat thickness and deformations can be analyzed.

Further, the stereo vision system can be used when a technician monitors the milking station, or inspects the milking station for errors. Thus, the stereo vision system can operate as a simple surveillance system. It can easily detect any movement around the robot and trespassers could be detected.

The stereo vision system is vulnerable to dirt or damages on the lenses of the cameras. By using image information dirt could be detected and allow for the system to attend to the problem.

By recording an image of the milking station e.g. when it is empty, a good reference image is created. The image can then be compared with later images. If the images do not differ more than to a given extent, no dirt has settled on the lens. This method is suitable for detecting lumps of dirt but it will probably not work well when it comes to detect slowly smeared lenses. Since this kind of dirt seldom appears suddenly, but is rather a slow deterioration in image quality. However, a smeared image could be compared to a strong blurring filter: the number of edges found in an image would be smaller the blurrier the lens is. Thus, by using images of the empty milking station it is probably possible to discover lumps of dirt and smeared areas by applying two different techniques.

If the cameras can be rotated around their own axes it is also possible to rotate them into such positions where they could detect dirt on each other. A lens is an easy object to automatically detect and it is possible to create a method for detecting dirt on an otherwise very clean surface.

The invention claimed is:

1. An arrangement for determining a position of a teat of a milking animal in a milking system including a robot arm for automatically attaching a teat cup to the teat of the milking animal when being located in a position to be milked, and a control device for controlling a movement of said robot arm based on determined positions of the teats of the milking animal, said arrangement comprising:
   a first camera pair having cameras located near each other in a substantially vertical direction and having image planes that are substantially coplanar with respect to one another, wherein the cameras are thereby directed to record substantially coplanar images and are directed towards the teat of the milking animal when being located in the position to be milked, and wherein the first camera pair is provided to repeatedly record pairs of vertically-aligned images with overlapping fields of vision; and
   an image processing device provided for repeatedly detecting the teat of the milking animal and stereoscopically determining the position of the teat based on said repeatedly recorded pairs of images,
   wherein said first camera pair is mounted below and behind the teat of the milking animal when being located in the position to be milked so that said first camera pair is directed diagonally upwards towards the teat of the milking animal when being located in the position to be milked.

2. The arrangement of claim 1, wherein the cameras of said first camera pair are movable relative to the milking system and to the milking animal when being located in a position to be milked in order for said cameras to be positioned at a location where the teat is not obscured from the first camera pair.

3. The arrangement of claim 1, further comprising a third camera mounted adjacent said first camera pair for repeatedly recording images simultaneously with the recording of said pairs of images,
   wherein said image processing device is provided for repeatedly detecting the teat of the milking animal and stereoscopically determining the position of the teat based on one of said repeatedly recorded pairs of images and said repeatedly recorded images of said third camera.

4. The arrangement of claim 3, wherein said image processing device is provided for stereoscopically determining the position of the teat based on said repeatedly recorded pairs of images and said repeatedly recorded images of said third camera.

5. The arrangement of claim 1, further comprising a second camera pair directed towards the teat of the milking animal when being located in the position to be milked, wherein the second camera pair is provided to repeatedly record pairs of images, wherein said image processing device is provided for repeatedly detecting the teat of the milking animal and stereoscopically determining the position of the teat based on said pairs of images repeatedly recorded by said second camera pair.

6. The arrangement of claim 5, wherein said second camera pair is mounted below the milking animal when being located in the position to be milked.

7. The arrangement of claim 5, wherein said second camera pair is mounted at the side of the milking animal when being located in the position to be milked.

8. The arrangement of claim 7, wherein said second camera pair is mounted at a height such that the teat of the milking animal belongs to an outer contour of the milking animal in the repeatedly recorded pairs of images.

9. The arrangement of claim 7, wherein said second camera pair is movable vertically in order to be positioned at a height such that the teat of the milking animal belongs to an outer contour of the milking animal in the repeatedly recorded pairs of images.

10. The arrangement of claim 1, wherein said image processing device is provided to determine an initial absolute position of the teat of the milking animal in a coordinate system of the milking system; and
    said image processing device is also provided to subsequently and repeatedly determine the position of the teat of the milking animal relative to the robot arm or the teat cup,
    wherein the subsequently determined position of the teat of the milking animal relative to the robot arm or the teat cup is more exact than said intially determined absolute position and is used for attachment of the teat cup to the teat of the milking animal.

11. The arrangement of claim 10, wherein the subsequently determined position is the relative position of the teat of the milking animal in a coordinate system of the first camera pair and wherein said image processing device is provided to repeatedly detect the robot arm or the teat cup and stereoscopically determine its relative position in the coordinate system of the first camera pair based on said repeatedly recorded pairs of images.

12. The arrangement of claim 10, wherein
    said first camera pair is provided to record said pair of images, wherein a plurality of reference points are located in a common field of vision of the first camera pair, the positions of the reference points being known in the coordinate system of the milking system; and
    said image processing device is provided to perform an absolute calibration process, in which the positions of image planes of the cameras of the camera pair are determined in the coordinate system of the milking system to allow determining the absolute position of the teat of the milking animal.

13. The arrangement of claim 10, wherein
    said first camera pair is provided to record said pair of images, wherein a plurlaity of reference points are located in a common field of vision of the first camera pair; and
    said image processing device is provided to perform a relative calibration process, in which the positions of image planes of the cameras of the camera pair are determined relative to each other to allow determining the position of the teat of the milking animal relative to another measured position.

14. The arrangement of claim 1, wherein said image processing device is provided, for the teat in each pair of images, to define the position of a lower tip of the teat contour in the pair of images as conjugate points for said stereoscopic determination, and to find said conjugate points along a substantially vertical epipolar line.

15. The arrangement of claim 1, wherein the cameras of the first camera pair are adjacent to one another.

16. An arrangement for determining a position of a teat of a milking animal in a milking system including a robot arm for automatically attaching a teat cup to the teat of the milking animal when being located in a position to be milked, and a control device for controlling a movement of said robot arm based on the determined position of the teat of the milking animal, said arrangement comprising:
  a first camera pair having cameras located near each other in a substantially vertical direction and having image planes that are substantially coplanar with respect to one another, wherein the cameras are directed towards the teat of the milking animal when being located in the position to be milked, and wherein the first camera pair is provided to repeatedly record pairs of vertically-aligned images; and
  an image processing device provided for repeatedly detecting the teat of the milking animal and stereoscopically determining the position of the teat based on said repeatedly recorded pairs of images,
  wherein the cameras of said first camera pair are next to one another and arranged vertically one above the other, such that the cameras are directed to record images that are substantially coplanar with respect to one another and to have overlapping fields of view; and
  wherein said image processing device is provided, for each teat and for each pair of images, to define the position of a lower tip of the teat contour in the pair of images as conjugate points for said stereoscopic determination, and to find said conjugate points along a substantially vertical epipolar line.

17. The arrangement of claim 16, wherein said image processing device is provided to compensate for a deviation caused by the lower tip of the teat contour in the pair of images corresponding to different objection points on the teat due to different perspective views of the cameras, wherein the image processing device performs the compensation based on the different perspective views and distance to the teat.

18. The arrangement of claim 16, wherein said first camera pair is mounted below and behind the teat of the milking animal when being located in the position to be milked so that said first camera pair is directed diagonally upwards towards the teat of the milking animal when being located in the position to be milked.

19. The arrangement of claim 18,
  wherein the cameras of said first camera pair are movable relative to the milking system and to the milking animal when being located in a position to be milked, in order for said cameras to be positioned at a location where the teat is not obscured from the first camera pair.

20. The arrangement of claim 16, further comprising a third camera mounted adjacent said first camera pair for repeatedly recording images simultaneously with the recording of said pairs of images,
  wherein said image processing device is provided for repeatedly detecting the teat of the milking animal and stereoscopically determining the position of the teat based on one of said repeatedly recorded pairs of images and said repeatedly recorded images of said third camera.

21. The arrangement of claim 20, wherein said image processing device is provided for stereoscopically determining the position of the teat based on said repeatedly recorded pairs of images and said repeatedly recorded images of said third camera.

22. The arrangement of claim 16, further comprising a second camera pair directed towards the teat of the milking animal when being located in the position to be milked, wherein the second camera pair is provided to repeatedly record pairs of images, and said image processing device is provided for repeatedly detecting the teat of the milking animal and stereoscopically determining the position of the teat based on said pairs of images repeatedly recorded by said second camera pair.

23. The arrangement of claim 22, wherein said second camera pair is mounted below the milking animal, when being located in the position to be milked.

24. The arrangement of claim 22, wherein said second camera pair is mounted at the side of the milking animal when being located in the position to be milked.

25. The arrangement of claim 24, wherein said second camera pair is mounted at a height such that the teat of the milking animal belongs to an outer contour of the milking animal in the repeatedly recorded pairs of images.

26. The arrangement of claim 24, wherein said second camera pair is movable vertically in order to be positioned at a height such that the teat of the milking animal belongs to an outer contour of the milking animal in the repeatedly recorded pairs of images.

27. The arrangement of claim 16, further comprising at least one light source provided for illuminating an udder of the milking animal to thereby increase a contrast in the repeatedly recorded pairs of images.

28. The arrangement of claim 16, wherein, in an initial stage, said image processing device is configured to determine an absolute position of the teat of the milking animal in a coordinate system of the milking system.

29. The arrangement of claim 28, wherein said image processing device is configured to repeatedly determine, after the initial stage, the position of the teat of the milking animal relative to the robot arm or the teat cup as the robot arm moves towards attaching the teat cup to the teat of the milking animal.

30. The arrangement of claim 29, wherein the position of the teat of the milking animal relative to the robot arm or the teat cup is more exact than said absolute position.

31. The arrangement of claim 16, wherein said image processing device is provided to determine an initial absolute position of the teat in a coordinate system of the milking system and provided to determine, after determining the initial position, a relative position of the teat relative to the robot arm or the teat cup, wherein the relative position of the teat is used during attachment of the teat cup to the teat of the milking animal.

32. The arrangement of claim 16, wherein the cameras of the first camera pair are adjacent to one another.

* * * * *